Patented Aug. 11, 1931

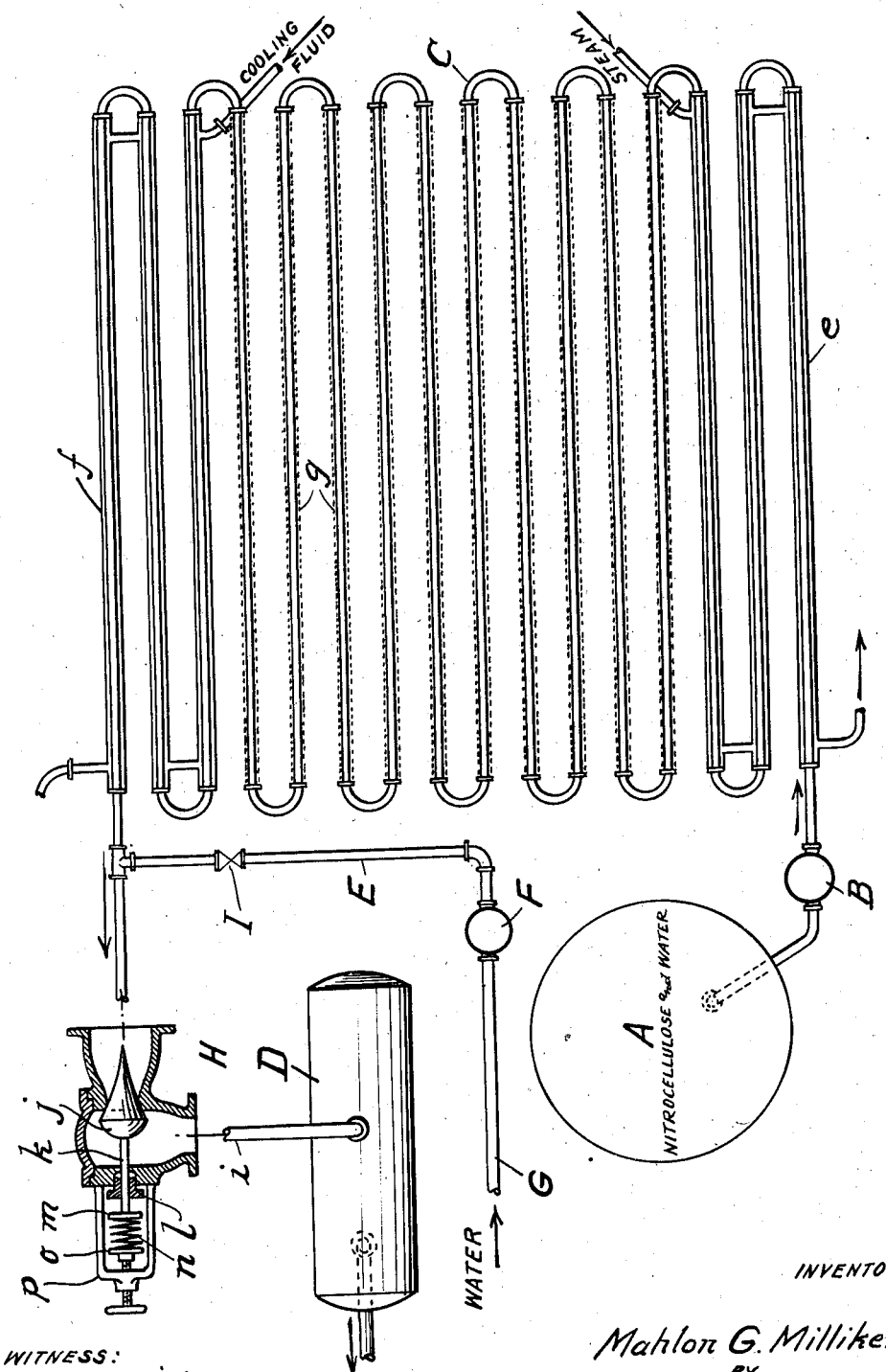

1,818,733

UNITED STATES PATENT OFFICE

MAHLON G. MILLIKEN, OF PARLIN, NEW JERSEY, ASSIGNOR TO HERCULES POWDER COMPANY, OF WILMINGTON, DELAWARE, A CORPORATION OF DELAWARE

METHOD FOR THE DIGESTION OF NITROCELLULOSE

Application filed February 23, 1928. Serial No. 256,140.

My invention relates to an improvement in method for the treatment of nitrocellulose, and more particularly relates to a method for the digestion of nitrocellulose to effect reduction of its viscosity, increase its stability, and for its purification.

As is well known in the production of nitrocellulose, cellulose, as for example cotton, is subjected to nitration, then washed to free it from acids, then subjected to a boiling treatment or digestion and finally subjected to further washing or other treatment for its purification. In the production of nitrocellulose heretofore the boiling treatment or digestion of the nitrated cellulose has been carried out in large closed digesters containing, for example, 1000 cubic feet of water and 4000 pounds of nitrocellulose, the mass being heated to a temperature of from 115° C.— 132° C., the nitrocellulose remaining in the digestor for a period of say from six hours to thirty hours, including the time required to bring the mass to treating temperature and for such partial cooling as is desirable before discharge of the mass from the digestor, the time of treatment depending upon the nitrogen content of the nitrocellulose and the degree of viscosity reduction and/or stabilization desired, by the circulation through the nitrocellulose of heated water. Such procedure for the digestion of nitrocellulose is disadvantageous for many reasons, chief among which are that it is impossible to quickly and uniformly heat the large mass of nitrocellulose, the large mass is a source of danger, the nitrocellulose tends to pack and the removal of entrapped air and gas, which tends to keep portions of the mass out of contact with the water, is difficult.

Further it has been found in the case of nitrocotton, that due to packing, when the nitrocotton loses its strength during the digestion, it is impractical to produce a nitrocotton with a viscosity much below one half second.

Now it is the object of my invention to provide a novel method and apparatus for the digestion of nitrocellulose whereby the disadvantages of the prior procedure will be eliminated and whereby a nitrocellulose of reduced viscosity and of greater stability and purity than heretofore will be produced.

In accordance with my invention nitrocellulose, after removal from the nitrating bath and washing for the removal of acids, is forced under pressure together with water through a restricted passage, as a coil of relatively small cross section and having a restricted outlet, provided, for example, by a needle valve. The mixture of water and nitrocellulose pass through the coil together at a relatively high velocity and at a regulated temperature. On passing out of the coil the nitrocellulose may be subjected to such further treatment as is desired.

Further my invention contemplates the provision of means for supplying additional water to the mixture of nitrocellulose and water at a point adjacent the outlet from the coil, thus facilitating discharge of the nitrocellulose-water mixture and avoidance of jamming and at the same time assisting in washing out acid from the nitrocellulose and hence promoting its stability.

Having now indicated in a general way the nature and purpose of my invention, I will proceed to a more detailed description thereof with reference to the accompanying drawing in which an apparatus in accordance with my invention is shown diagrammatically, a form of needle valve for controlling the outlet from the coil being shown in section.

In the apparatus illustrated A indicates an agitating tub for the reception of nitrated cellulose to be digested and in which the nitrated cellulose is mixed with water. B indicates a pump adapted for drawing nitrated cellulose and water from the tub A and forcing the mixture into and through the coil C which is formed, for example, from a number of pipe sections connected by return bends. D indicates a surge tank into which the nitrocellulose and water is discharged from the coil. A portion of the coil at the inlet end is jacketed as indicated at $e$, the jacket being provided with an inlet and outlet for steam adapted for heating the nitrocellulose and water, and a portion of the coil at its outlet end is jacketed as indicated at $f$, the jacket $f$ being provided with an inlet and outlet for water adapted for cooling the nitrated cellulose and water. The intermediate portion of the coil is preferably covered with insulating material, for example asbestos, as indicated at $g$ in order to maintain the desired temperature of the nitrocellulose and water in the intermediate portion of the coil.

The needle valve H which controls the outlet end of the coil comprises a casing adapted for connection to the outlet end of the coil C and to a pipe $i$ connected to the surge tank D. Within the casing is provided a valve seat on which is adapted to seat a conical valve $j$, the valve being arranged in line with the outlet from the coil. The stem $k$ of valve $j$ extends externally of the casing through a stuffing box $l$ and is provided at its outer end with a head $m$ against which one end of a spring $n$ abuts. The other end of spring $n$ abuts against a stop $o$ adjustably carried by a bracket $p$ attached to the casing. The valve $j$ is thus yieldingly held on its seat by spring $n$, the tension of which is set to permit the valve to normally open against a given pressure in the coil C and at the same time permit further opening of the valve to free any jam of nitrocellulose which may occur at the valve due to the packing tendency of the nitrated cellulose.

Adjacent the outlet end of the coil C just ahead of the valve H a pipe E is let into the coil and connected to the discharge of the pump F to the intake of which is connected a pipe G leading from a suitable supply of water, either an independent supply or that in or overflowed from tank D. The passage of water through pipe E is controlled by a valve I.

As a more specific example of a form of apparatus for use in connection with the digestion of, for example nitrocotton, the various elements are preferably made of chrome steel and the coil may desirably have a diameter of three and a one-half inches, and a length of about sixteen hundered feet.

In the treatment of the nitrocotton, according to the method embodying my invention, for example, nitrocotton, is placed on the tub A with water in about the proportion of one nitrocotton to twenty-five water. The mixture of nitrocotton and water is pumped through the coil at a pressure of about 80 pounds per square inch, and at a substantial velocity, say, for example, about two feet per second, by the pump B and the mixture of nitrocotton and water in the coil is brought to a suitable temperature, (say about 160° C.) by the introduction of steam into the jacket $e$. A preferred range of temperature is from about 130°C. or possibly somewhat lower to about 160°C., although a temperature as high as 180°C. may be permissible. The valve $j$ is set so as to permit the nitrocotton and water to discharge into the surge tank and as has been indicated, jamming of the nitrocotton is prevented by the fact that the valve is yieldingly held and on a building up of pressure, due to jamming of nitrocotton, will open wider and permit the passage of any jammed or matted nitrocotton. During the treatment water under pressure is forced into the coil C adjacent to valve H through pipe E and acts to insure operation of the valve H on jamming of the nitrated cotton and also to maintain the valve normally at a desired open position. The water introduced into coil C through pipe E also acts to increase the proportion of water to nitrated cotton at a point of discharge, thus facilitating the discharge of the mixture and acting to wash out acidity from the nitrated cotton. The water admitted through the pipe E may, as has been indicated, be drawn from an independent supply, or it may be drawn from tank D directly or indirectly, thus in effect recirculating a part of the water from the nitrated cotton-water mixture discharged from the coil. The water may be heated or at room temperature, and may be introduced into the coil in quantity and under pressure varying with the characteristics of the mixture and pressure within the coil and with the desired control of valve H.

Nitrated cotton on discharge into the surge tank will be found to be of the desired viscosity and stability and of greater purity than was heretofore obtained by previously known processes, and the result is obtained with great saving of time and increased safety.

It will be noted that the valve $j$ controls the discharge from the coil or passage $c$ through the exertion of back pressure on the discharge end of the coil or passage.

It will be understood that I contemplate as within the scope of my invention the use as a carrier liquid of any liquid, non-solvent for nitrated cellulose and operably equivalent for water. It will be understood that practice of the process is not dependent upon the use of any particular form of apparatus.

The apparatus described herein is not claimed herein as such forms the subject matter of an application for patent filed by me July 14, 1928, Serial No. 292,808, as a division hereof.

This application constitutes a continuation in part of my application, Serial No. 241,075, filed December 19, 1927.

Having now fully dscribed my invention, what I claim and desire to protect by Letters Patent is:

1. The method of digesting nitrated cellulose which includes passing nitrated cellulose and a non-solvent carrier liquid through a passage and applying heat to nitrated cellulose in the passage.

2. The method of digesting nitrated cellulose which includes passing nitrated cellulose and water under pressure through a passage and applying heat to nitrated cellulose in the passage.

3. The method of digesting nitrated cellulose which includes passing nitrated cellulose and water under pressure through a passage and cooling the nitrated cellulose and water before its discharge from the passage.

4. The method of digesting nitrated cellulose which includes forcing nitrated cellulose and a non-solvent carrier liquid under pressure through a passage, applying heat to nitrated cellulose in the passage and maintaining a substantially uniform pressure within the passage.

5. The method of digesting nitrated cellulose which includes forcing nitrated cellulose and a non-solvent carrier liquid under pressure through a passage, applying heat to nitrated cellulose in the passage and exerting a back pressure on the discharge from said passage.

6. The method of digesting nitrated cellulose which includes passing nitrated cellulose and water under pressure through a passage, applying heat to nitrated cellulose in the passage and exerting back pressure on nitrocellulose within the passage.

7. The method of digesting nitrated cellulose which includes passing nitrated cellulose and water under pressure through a passage, applying heat to nitrated cellulose in the passage and controlling the discharge of nitrated cellulose from said passage.

8. The method of digesting nitrated cellulose which includes forcing nitrated cellulose and a non-solvent carrier liquid under pressure through a passage, applying heat to nitrated cellulose in the passage and maintaining a substantially uniform pressure within the passage by control of the discharge therefrom.

9. The method of digesting nitrated cellulose which includes forcing nitrated cellulose and water under pressure through a passage of relatively small area in cross section and of substantial length and heating the nitrated cellulose and water at a point adjacent the inlet end of said passage.

10. The method of digesting nitrated cellulose which includes forcing nitrated cellulose and water under pressure through a passage of relatively small area in cross section and of substantial length and cooling the nitrated cellulose and water before its discharge from said passage.

11. The method of digesting nitrated cellulose which includes forcing the nitrated cellulose and a non-solvent carrier liquid under pressure through a passage of relatively small area in cross section and of substantial length, applying heat to nitrated cellulose in the passage and controlling the discharge of nitrated cellulose from said passage.

12. The method of digesting nitrated cellulose which includes forcing the nitrated cellulose and a non-solvent carrier liquid under pressure through a passage of relatively small area in cross section and of substantial length and provided with a restricted outlet.

13. The method of digesting nitrated cellulose which includes forcing nitrated cellulose and water under pressure through a passage of relatively small area in cross section and of substantial length and provided with a restricted outlet.

14. The method of digesting nitrated cellulose which includes forcing nitrated cellulose and water under pressure through a passage of relatively small area in cross section and of substantial length, heating the nitrated cellulose and water in a portion of the passage adjacent to the inlet end thereof, cooling the nitrated cellulose and water in a portion of the passage adjacent the discharge end thereof, substantially maintaining the temperature of the nitrated cellulose and water in the portion of the passage intermediate the portions adjacent the inlet and discharge ends thereof and restricting the discharge from said passage.

15. The method of digesting nitrated cotton which includes forcing nitrated cotton through a passage of relatively small diameter and of substantial length under a pressure of about eighty pound per square inch and at a temperature of about 160° C. during the major portion of its travel through the passage.

16. The method of digesting nitrated cellulose which includes forcing nitrated cellulose and a non-solvent carrier liquid under pressure through a passage of relatively small area in cross section and of substantial length and introducing an additional quantity of carrier liquid into the passage adjacent the discharge end thereof.

17. The method of digesting nitrated cellulose which includes forcing nitrated cellulose and a non-solvent carrier liquid under pressure through a passage of relatively small area in cross section and of substantial length and provided with a restricted outlet and introducing an additional quantity of carrier liquid into the passage adjacent the discharge end thereof.

18. The method of digesting nitrated cellulose which includes forcing nitrated cellulose and water under pressure through a passage of relatively small area in cross section and of substantial length and introducing an additional quantity of water into the passage adjacent the discharge end thereof.

19. The method of digesting nitrated cellulose which includes forcing nitrated cellulose and water under pressure through a passage of relatively small area in cross section and of substantial length and returning into said passage at a point adjacent its discharge end water discharged therefrom.

20. The method of digesting nitrated cellulose which includes forcing nitrated cellulose and water under pressure through a passage of relatively small area in cross section and of substantial length, heating the nitrated cellulose and water in a portion of the passage adjacent to the inlet end thereof, substantially maintaining the temperature of the nitrated cellulose and water in a portion of the passage beyond the heated portion, cooling the nitrated cellulose and water in a portion of the passage adjacent to the said last portion, controlling the discharge from said passage beyond the cooling portion, and introducing an additional quantity of water into the passage adjacent the discharge end thereof.

In testimony of which invention, I have hereunto set my hand, at Parlin, N. J., on this 10th day of Feb., 1928.

MAHLON G. MILLIKEN.